United States Patent [19]
Fiory

[11] Patent Number: 5,624,590
[45] Date of Patent: Apr. 29, 1997

[54] SEMICONDUCTOR PROCESSING TECHNIQUE, INCLUDING PYROMETRIC MEASUREMENT OF RADIANTLY HEATED BODIES AND AN APPARATUS FOR PRACTICING THIS TECHNIQUE

[75] Inventor: Anthony T. Fiory, Summit, N.J.

[73] Assignee: Lucent Technologies, Inc., Murray Hill, N.J.

[21] Appl. No.: 418,337

[22] Filed: Apr. 7, 1995

Related U.S. Application Data

[63] Continuation-in-part of Ser. No. 227,844, Apr. 14, 1994, Pat. No. 5,442,727, which is a continuation-in-part of Ser. No. 42,028, Apr. 2, 1993, Pat. No. 5,305,416.

[51] Int. Cl.$^6$ ......................................................... G01J 5/00
[52] U.S. Cl. ........................... 219/390; 392/416; 118/724; 374/126
[58] Field of Search ................................... 219/390, 405, 219/411; 392/416, 418; 118/724, 725, 50.1; 374/126, 128–132, 9; 250/492.1, 504 R

[56] References Cited

U.S. PATENT DOCUMENTS

| | | | |
|---|---|---|---|
| 4,919,542 | 4/1990 | Nulman et al. | 374/126 |
| 5,061,084 | 10/1991 | Thompson et al. | 374/128 |
| 5,114,242 | 5/1992 | Gat et al. | 374/128 |
| 5,147,498 | 9/1992 | Nashimoto | 156/627.1 |
| 5,154,512 | 10/1992 | Schietinger et al. | 374/9 |
| 5,166,080 | 11/1992 | Schietinger et al. | 374/120 |
| 5,226,732 | 7/1993 | Nakos et al. | 374/126 |
| 5,239,488 | 8/1993 | Markham et al. | 374/130 |
| 5,305,416 | 4/1994 | Fiory | 392/416 |
| 5,308,161 | 5/1994 | Stein | 374/5 |
| 5,310,260 | 5/1994 | Schietinger et al. | 374/128 |
| 5,318,362 | 6/1994 | Schietinger et al. | 374/128 |
| 5,350,236 | 9/1994 | Thakur et al. | 374/129 |
| 5,442,727 | 8/1995 | Fiory | 392/416 |

FOREIGN PATENT DOCUMENTS

| | | | |
|---|---|---|---|
| 490914 | 6/1955 | Italy | 374/130 |
| 763698 | 9/1980 | U.S.S.R. | 374/126 |

OTHER PUBLICATIONS

Fiory et al, "Optical Fiber Pyrometry With In–situ Detection fo Wafer Radiance and Emittance—Accufiber's Ripple Method", Mat. Res. Soc. Symp. Proc., vol. 303.

Primary Examiner—John A. Jeffery
Attorney, Agent, or Firm—Richard J. Botos

[57] ABSTRACT

In an apparatus and process for heating, e.g., a semiconductor wafer within a processing chamber, the wafer is exposed to a flux of electromagnetic radiation from lamps energized by alternating electric current. The surface temperature of the wafer is measured, and responsively, the radiation flux is controlled. The temperature measurement procedure includes collecting radiation propagating away from the wafer in a first probe, collecting radiation propagating away from the wafer and radiation from the lamps in a second probe, and detecting radiation collected in the respective probes. This procedure further involves deconvolving the multiphase ac component of the signal received from each probe, determining the linear functional relationship of the first probe signal as a function of the second probe signal resulting from time-variations of the energizing current, and using this linear functional relationship along with the signal data according to a mathematical expression to infer the temperature. The probes are oriented such that the first probe samples radiation from a portion of the wafer that subtends an angle $\Omega_1$ from the first probe and the second probe samples radiation from the same portion of the wafer and at least one lamp which subtends a solid angle $\Omega_2$.

12 Claims, 3 Drawing Sheets

1

SEMICONDUCTOR PROCESSING TECHNIQUE, INCLUDING PYROMETRIC MEASUREMENT OF RADIANTLY HEATED BODIES AND AN APPARATUS FOR PRACTICING THIS TECHNIQUE

RELATED APPLICATION INFORMATION

This application is a continuation-in-part of U.S. application Ser. No. 08/227,844 which was filed on Apr. 14, 1994, now U.S. Pat. No. 5,442,727, which is a continuation-in-part application of U.S. application Ser. No. 08/042,028, which was filed on Apr. 2, 1993, and which issued as U.S. Pat. No. 5,305,416 on Apr. 19, 1994, the disclosures of which are incorporated by reference.

FIELD OF THE INVENTION

This invention relates to the field of pyrometry, and more particularly, to pyrometric observation of radiantly heated semiconductor wafers within reactors or furnaces designed for rapid thermal processing.

ART BACKGROUND

In rapid thermal processing (RTP), workpieces such as semiconductor wafers can be subjected to specified temperature cycles of arbitrary complexity. For this reason, RTP is useful for carrying out thermally dependent processes, such as diffusion and annealing, in the course of manufacturing integrated circuits. However, some of these processes require the temperature to be controlled within limits as small as ±10° C. or less. Such fine control is possible only if the wafer temperature can be measured to precision that is comparably high.

Optical pyrometry is one useful method for controlling the temperature of the wafer during RTP. One pyrometric technique has been described in U.S Pat. No. 5,154,512, issued to C. W. Schietinger et al. on Oct. 13, 1992. This technique is schematically illustrated in FIG. 1. According to this technique, a first light-pipe probe 10 is provided, having an input aperture that faces wafer 20, and a second probe 30 is provided having an aperture that faces one of opposing lamp banks 40, which are typically linear arrays of quartz-tungsten-iodine lamps situated outside of processing chamber 50. First probe 10 samples radiation emitted and reflected by the wafer and directs the sampled radiation into detector 60. Second probe 30 samples radiation emitted by the lamps and directs the sampled radiation into the detector. Probe 30 receives radiation both in a direct path from the lamps and also by reflection from reflector 80. The emissivity ε of the wafer is inferred from the probe signals, and then the wafer temperature is inferred from the Planck radiation law, which relates the wafer thermal emittance, the wafer emissivity, and the wafer temperature T.

As noted, the first probe signal is a sum of emitted and reflected radiation. Information sufficient to resolve the emitted and reflected components is available because the emission from the lamps, which are driven by alternating current, has an ac component referred to as "ripple". Because the thermal emission from the wafer has no significant ac component, the wafer reflectivity is estimated as the ratio of the ripple amplitudes in the first and second probe signals, respectively. After this reflectivity has been evaluated, the first probe signal is corrected to yield a resolved value of the water thermal emittance.

However, the above described techniques provide undesirable constraints on the placement of the probes. Because the ac signals of the probes are used to directly determine the reflectivity, one probe must "see" only the wafer and the other probe must "see" only the lamps. In the prior an pyrometer in FIG. 1, the light pipe probe 10 is configured and placed to see only the wafer 20 and the light pipe probe 30 is configured and placed to see only the light source 40. This provides certain constraints on probe placement. First, as illustratively in FIG. 1, the probes 10 and 30 project into the chamber. Particles are generated during the RTP process, and these particles deposit on the probes. Consequently, the probes must be removed and cleaned, which is a difficult and time-consuming process. Furthermore, since the process is sensitive to the position of the probe relative to the wafer and the lamp, the probes must be reinserted in almost exactly the same position they were in prior to removal. Otherwise, the pyrometer has to be recalibrated. Also because of the spatial constraints in the RTP enclosure 50, it is difficult to provide space for the probes 10 and 30.

Consequently, an optical pyrometry process and apparatus which does not have the above-noted constraints on probe placement is desired.

Although useful, this technique requires the probes to be located in proximity to the wafer or, at the very least within the oven enclosure. The probes are oriented such that they collect radiation incident upon, and reflected from, the wafer.

SUMMARY OF THE INVENTION

In the process and apparatus of the present invention, optical pyrometry is performed by using at least two optical probes to controllably heat wafers in a chamber. A first probe is positioned so that it collects radiation emanating from the wafer, but does not collect radiation directly from the heating lamps. The radiation collected by the first probe is controlled by positioning the first probe in a manner that restricts the radiation it can collect.

In one embodiment, the first probe is positioned at the boundary of the processing chamber. The field of view of the first probe is such the wafer subtends an angle $\Omega_1$ that defines the field of view from the first probe. The first probe is placed such that no lamp is in the field of view between the first probe and the wafer.

To restrict the field view of this probe in the appropriate manner, it is advantageous if the first probe does not extend into the chamber. In this embodiment, the first probe is positioned behind an iris diaphragm placed at the inner surface of the oven chamber. The iris diaphragm restricts the field of view of the first probe (denominated an iris probe in this embodiment) to an oblong portion of the wafer and a portion of the quartz tube interposed between the wafer and the iris probe. The first probe is positioned at the boundary of the chamber and the radiation-collecting portion of the probe does not significantly extend into the chamber.

A second probe is also positioned at the boundary of the chamber. However, this probe has a larger field of view than the first probe. In the context of the present invention, a larger field of view means that the field of view of the second probe, which is defined by an angle $\Omega_2$ from the probe tip, contains at least the field of view of the first probe and the lamps that flank the field of view of the first probe $\Omega_1$. Consequently, the signal collected by the second probe is radiation from the wafer, quartz tube, lamps, and interior surfaces of the chamber. Although it is advantageous if the radiation-collecting portion of the probe does not extend into the chamber, in an alternate embodiment at least some of the radiation-collecting portion of the probe extends from the chamber wall into the chamber. In one embodiment of the present invention, the field of view defined by $\Omega_2$ is sampled directly by the lamp probe. In an alternate embodiment, the lamp probe samples the image of the field of view defined by $\Omega_2$ that is reflected from the wall of the chamber that is adjacent to the lamp probe.

Both the first and second probes are oriented toward the object being heated. Because the field of view of the second probe contains the field if view of the first probe, it is advantageous if the probes are located adjacent to each other, i.e. both probes are proximate each other in the chamber. In this regard it is advantageous if both probes are fixed in the same wall of the chamber. These improvements make it possible to routinely measure the wafer temperature with an accuracy of ±10° C. or better at typical processing temperatures. Additional improvements involve details of the modeling of the radiation environment within the processing chamber that lead to more accurate interpretation of the signals from the first and second probes.

Accordingly, one embodiment of the process of the present invention involves heating a body by exposing the body to a controllable flux of electromagnetic radiation from one or more lamps energized by alternating electric current, measuring the surface temperature of the body, and in response to the temperature measurement, controlling the flux of electromagnetic radiation. The temperature measurement is carried out, in part, by collecting a portion of thermal radiation and reflected lamp radiation propagating away from the body in a first probe, collecting a portion of lamp radiation propagating toward the second probe, and detecting, as respective first and second radiation signals, at least a portion of the radiation collected in the first and second probes. The temperature measurement further involves determining, in each of the first and second signals, a magnitude of a time-varying component resulting from time-variations of the energizing current. The temperature measurement further involves combining at least these magnitudes according to a mathematical expression from which the temperature can be inferred.

DETAILED DESCRIPTION

Figure 1:
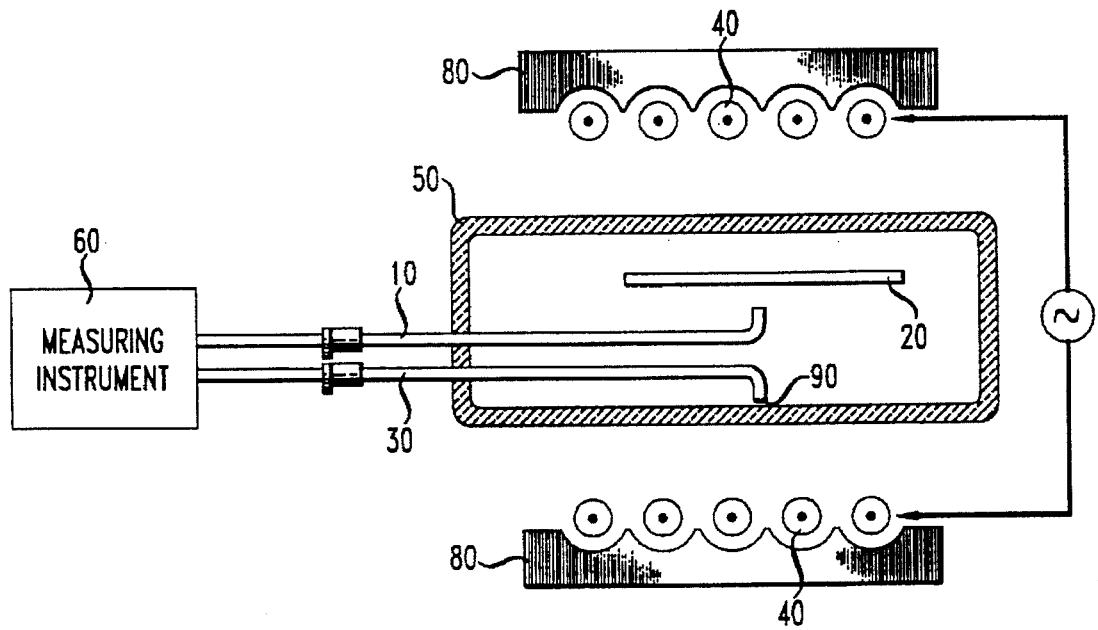
FIG. 1 is a simplified, schematic drawing of an RTP system of the prior art.
Figure 2:
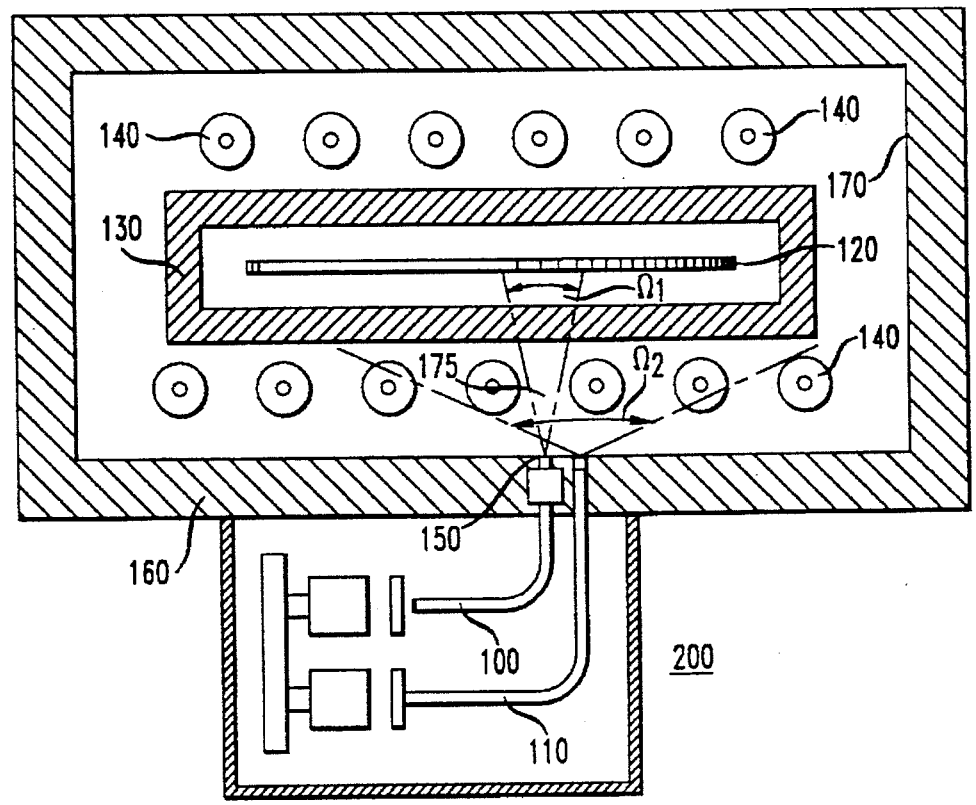
FIG. 2 is a simplified, schematic drawing of an RTP system including a pair of radiation-sensing probes according to the present invention.

Depicted in FIG. 2 is a RTP reactor in which wafer probe 100 and lamp probe 110 are arranged according to a currently preferred embodiment of the invention. Wafer 120 is enclosed within a processing chamber having a quartz envelope 130. The figure shows both probes situated outside envelope 130. In alternative arrangements, one or both probes can be installed within the envelope. As illustrated, lamps 140 are installed in banks on two opposing sides of envelope 130. (In alternate reactor designs, only a single lamp bank is used.) Each individual lamp typically has a cylindrical configuration and the lamps 140 are depicted in cross-section in FIG. 2.

Entrance face 150 of the wafer probe 100 is directed toward the wafer. As illustrated, the water probe 100 is situated such that the lamps 140 are not within its field of view, which is designated by $\Omega_1$. The wafer probe 100 is exemplary a light-pipe probe that is 1.5 mm in diameter, and that has an optical baffle 150, such as an iris probe, that restricts its field of view. Wafer probe 100 captures wafer radiance from a relatively small spot on the wafer 120 surface, exemplarily an oblong region that is about 1 cm wide by 2 cm long. Wafer probe 100 is desirably located near a gap 175 between a successive pair of lamps in one of the lamp banks.

Since the lamps are depicted in cross-section, $\Omega_1$ and $\Omega_2$ as depicted in FIG. 2 are actually rotated 90° with respect to the lamps 140. That is $\Omega_1$ and $_{106}$ $_2$ are actually parallel to the direction of the individual cylindrical lamps 140. However, the restrictions on $\Omega_1$ and $\Omega_2$, i.e. that no lamps 140 subtend $\Omega_1$ and the portion of the wafer that subtends $\Omega_1$ and at least one lamp subtend $\Omega_2$, still govern in the placement of probes 100 and 110.

Enclosure 160 at least partially surrounds the quartz envelope 130 and the lamps 140. This enclosure 160 has an inner surface 170. A Model 4100 Heatpulse reactor commercially available from AG Associates of Sunnyvale, Calif. is an example of a suitable reactor. Most of surface 170 of this reactor, as originally provided, is plated with gold. Typically the surface 170 is diffusively reflective. In an alternate embodiment, however, the surface 170 is specular.

Lamp probe 110 is preferably situated at surface 170. Probe 110 has a field of view, $\Omega_2$, that contains both the entire portion of the wafer 120 within the field of view $\Omega_1$ of probe 100 and the lamps 140 that flank $\Omega_1$. In one embodiment of the present invention, the lamp probe 110 detects radiation directly from the field of view defined by $\Omega_2$. In an alternate embodiment, the lamp probe detects radiation indirectly by detecting the image of radiation in the field of view $\Omega_2$ that is reflected from the chamber wall 170 that is adjacent the lamp probe 110. In a departure from the prior art, the lamp probe 110 collects radiation from the same direction as the wafer probe 100 and there is nothing interposed between the wafer probe 100 and the lamp probe 110. However, probe 110, has a larger field of view in the chamber than probe 100.

In a currently preferred embodiment, probe 110 is a diffusive window light-pipe that is 1.5 mm in diameter. In the context of the present invention, a diffusive window is a material that transmits light but not necessarily an image. It is advantageous if probe 110 extends a small distance into the enclosure 160.

Figure 3:
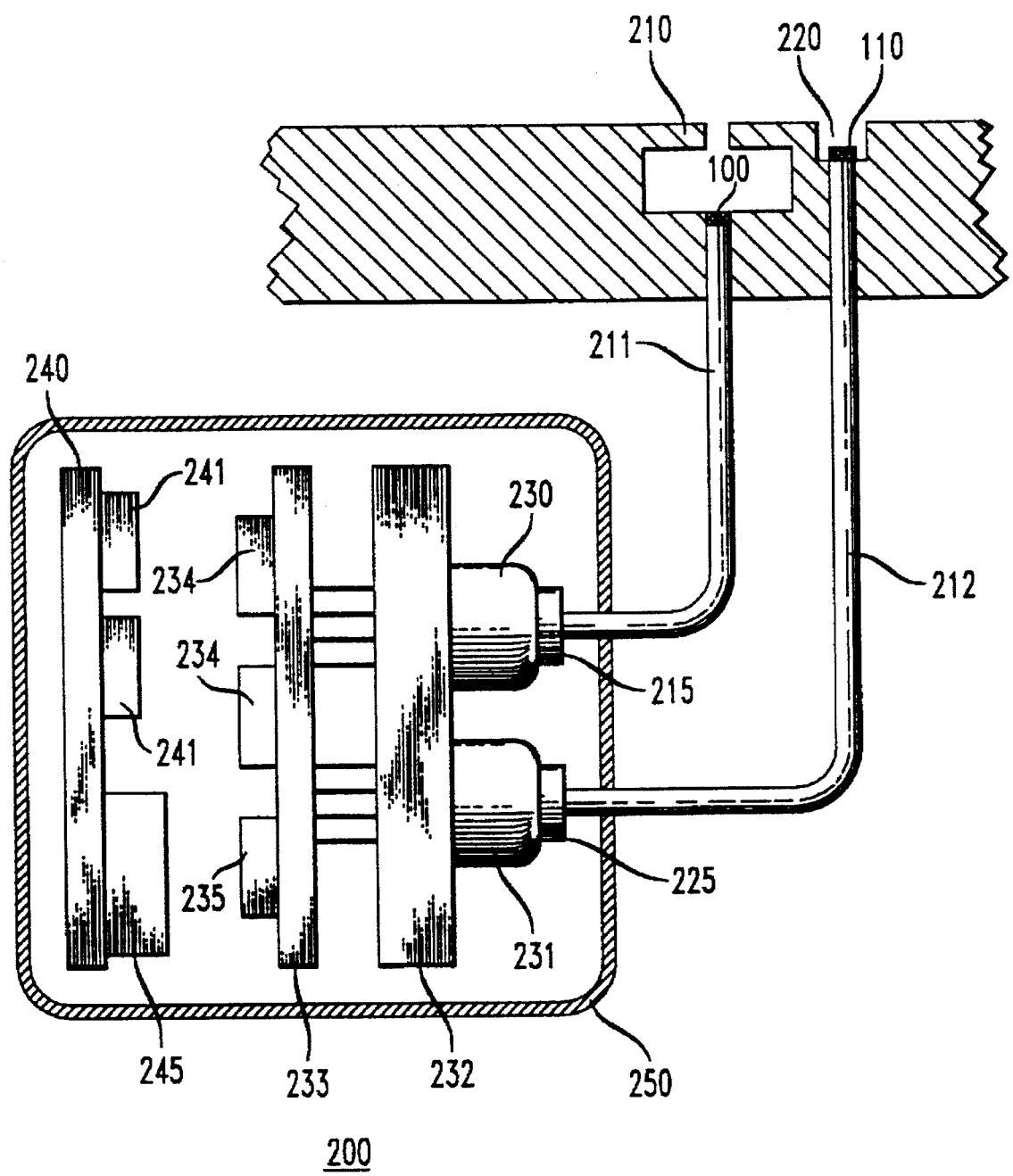
FIG. 3 is a detail view of the area 200 in FIG. 2.

FIG. 3 illustrates in greater detail the area 200 depicted in FIG. 2. As shown in FIG. 3, probe 100 is situated in the bottom of an aperture 210 in the wall 160 of the oven enclosure. This aperture 210 restricts the field of view of the probe 100. Probe 110 is situated in an aperture 220 in the wall 160 of the enclosure. The purpose of the aperture 220 is to avoid contact between the tip of the probe 110 and the wall 160 of the oven enclosure. The probes 100 and 110 are optically coupled to gold-plated channels 211 and 212, respectively. The gold-plated channels 211 and 212 are optically connected, through respective optical filters 215 and 225 to respective photodetectors 230 and 231. Examples of suitable photodetector are Indium Arsenide (InAs) photodetectors that are obtained commercially from EG&G Judson of Montgomeryville, Pa. (Part No. 420040). The photodetectors 230 and 231 are mounted on a water-cooled heat sink 232 and electrically coupled to a printed circuit board 233. The printed circuit board illustrated in FIG. 3 is equipped with two preamp detectors 234 and a thermistor preamp 235. Another printed circuit board 240 is also provided on which are two ac/dc amplifiers 241 and an electrical connector 245 to transmit the signals to a data processor (not shown). The photodetectors, filters, and printed circuit boards are all within a magnetic shield 250.

The present method is premised upon the fact that the wafer does not transmit the lamp radiation. This condition is met if: the wafer temperature is above 600° C., the condition is also met if the silicon water substrate is heavily doped (e.g. dopant concentration is at least about $2 \times 10^{15}$ dopant atoms/cm$^3$) such that the resistivity of the silicon is less than about 0.01 $\Omega$cm. One example of a suitable dopant is a p+ dopant such as boron. This condition is also met if the the wafer is coated with a metal film that is not transparent to the lamp radiation. Titanium is an example of one such metal film.

The probe signals (from the wafer probe 100 and the lamp probe 110) are used to controllably heat the wafer in the chamber. It should be noted that the fluctuations of lamp radiation within the reactor are more complicated than simple ripple (i.e. the ac signal component of the lamps) at twice the power-line frequency. In addition to fluctuations at harmonics of this frequency, there are also non-harmonic fluctuations that are attributed, e.g., to variations in lamp power caused by the feedback circuit that controls the water temperature, and to the finite response time of the lamps. Consequently, it is preferred to compute the a.c. components of these signals from time-dependent first and second moments. Since the thermal emission from the water does not have a significant ac component, the ac components of these signals describe water reflectivity. That is, the optical signals from the probes are directed to photodiode amplifiers, and the amplifier outputs are fed into analog-to-digital converters (ADCs), leading to digitized signals $V_1(t)$ (which corresponds to the signal from wafer probe 100) and $V_2(t)$ (which corresponds to the signal from the lamp probe 110). The sampling times t are spaced at intervals $\delta_1$ typically equal to 0.2 ms. The amplifiers have analog filters of about 1 ms to suppress digitization aliasing noise.

One component of digitized signal $V_1$ from the wafer probe 100 is reflected lamp radiation (i.e., lamp radiation that is reflected from the wafer). The reflected lamp radiation is also a fraction R of digitized signal $V_2$ from the lamp probe 110. This is expressed as a partial derivative:

$$R = \frac{\partial V_1}{\partial V_2}. \tag{1}$$

Typically, the ac power used to excite the heating lamps has more than one phase or group. For example, where there are three groups of lamps connected respectively to three power line phases, each denoted as A, B, and C, the fluctuating components are shifted in time by a multiple of the period of the first harmonic of the ac line divided by the number of phases, i.e., 0, 1, or 2 times the quantity $$\tau_p = \frac{1}{6f}, \tag{2}$$

where f is the power line frequency (e.g., 60 Hz in the United States). The fraction of $V_1(t)$ originating from lamps in group A is denoted $A_1$; the fraction from the remaining phases are denoted $B_1$ and $C_1$. The fractions of $V_2(t)$ originating from the lamps of each phase are denoted similarly as $A_2$, $B_2$, and $C_2$. The fractions are determined by selectively energizing the lamp groups individually and measuring the ac components of $V_1(t)$ and $V_2(t)$ for each group.

Generally, the fractions are not the same for the two detectors, i.e., $A_1/A_2 \approx B_2 \approx C_1/C_2$, which leads to different 3-phase patterns in the raw signals for the two detectors. It is therefore advantageous to suppress this difference by computing deconvolution signals that contain periodicities with one phase. That is, the three phases are deconvolved mathematically into one phase for further computation. This is approximated by replacing the raw signal by a weighted sum of its instantaneous value and its previous values at two earlier times, retarded by $\tau_p$ and $2\tau_p$. The deconvolution signals are denoted by $V'_1(t)$ and $V'_2(t)$ and are given by the following algebraic expressions:

$$V'_1(t) = a_1 V_1(t) + b_1 V_1(t-\tau_p) + c_1 V_1(t-2\tau_p), \text{ and} \tag{3}$$

$$V'_2(t) = a_2 V_2(t) + b_2 V_2(t-\tau_p) + c_2 V_2(t-2\tau_p). \tag{4}$$

The weighting coefficients, $a_1$, $b_1$, etc., are determined by linear algebra and matrix inversion from the lamp group tractions, $A_1$, $B_1$ etc. The mathematical expressions for the coefficients $a_1$, $b_1$, and $c_1$ in Eq. (3) are given by:

$$a_1 = (A_1^2 - B_1 C_1)/D_1, \tag{5}$$

$$b_1 = (B_1^2 - C_1 A_1)/D_1, \text{ and} \tag{6}$$

$$c_1 = (C_1^2 - A_1 B_1)/D_1, \tag{7}$$

where $$D_1 = A_1^3 + B_1^3 + C_1^3 - A_1 B_1 C_1. \tag{8}$$

The coefficients $a_2$, $b_2$, and $c_2$ for Eq.(4) are determined in analogous manner.

The next step is the computation of the fluctuating components in the deconvolved signals to compute the fraction R as expressed in equation 1. This fraction is obtained by first constructing a plot of $V_1$ vs. $V_2$ and obtaining a slope of this relationship using a least-squares fit. The statistical weight given to each of the points in the least-squares tit decreases exponentially with the age of the point. That is, older points are afforded less statistical weight than newer points. The formulations that are used to make these computations are described in sequence below. First, reference signals $U_1$ and $U_2$ are calculated by a method of recursive filtering from the input signals $V'_1$ and $V'_2$ using the following formulas:

$$U_1(t) = U_1(t-\delta_1) + \frac{\delta_1}{\tau_1} [V_1(t) - V_1(t-\delta_1)], \tag{9}$$

$$U_2(t) = U_2(t-\delta_1) + \frac{\delta_1}{\tau_1} [V_2(t) - V_2(t-\delta_1)]. \tag{10}$$

In formulas 9 and 10, $\delta_1$ is the time period between signal samples and $\tau_1$ is a time constant (typically 1 ms) on the order of the period of the ac radiation generated by the heating lamps. These values are subject to the relationship $\tau_1 > \delta_1$.

The fluctuating components of the signals are then calculated as the difference between the input and the reference signals. The calculation of R described above is performed using a least-squares fit of the slope in which the four intermediate terms are the running averages of linear, quadratic, and cross terms:

$$u_1(t) = u_1(t-\delta_2) + \frac{\delta_2}{\tau_2}[V_1(t) - U_1(t) - u_1(t-\delta_2)] \quad (11)$$

$$u_2(t) = u_2(t-\delta_2) + \frac{\delta_2}{\tau_2}[V_2(t) - U_2(t) - u_2(t-\delta_2)] \quad (12)$$

$$u_{12}(t) = u_{12}(t-\delta_2) + \frac{\delta_2}{\tau_2}[\{V_1(t) - U_1(t)\} \cdot \{V_2(t) - U_2(t)\} - u_{12}(t-\delta_2)] \quad (13)$$

$$u_{22}(t) = u_{22}(t-\delta_2) + \frac{\delta_2}{\tau_2}[\{V_2(t) - U_2(t)\}^2 - u_{22}(t-\delta_2)]. \quad (14)$$

In the above equations $\delta_2$ is about equal to $\delta_1$ and $\tau_2 > \tau_1$. Typically $\tau_2$ is approximately 10 ms.

The above terms are then combined and averaged in the following manner:

$$v_1(t) = v_1(t-\delta_3) + \frac{\delta_3}{\tau_3}[u_{12}(t) - u_1(t)u_2(t) - v_1(t-\delta_3)] \quad (15)$$

$$v_2(t) = v_2(t-\delta_3) + \frac{\delta_3}{\tau_3}[u_{22}(t) - u_2^2(t) - v_2(t-\delta_3)]. \quad (16)$$

In these equations $\delta_3$ is approximately equal to $\delta_1$ and $\tau_3$ is $>\tau_2$. The slope is then computed by:

$$w(t) = w(t-\delta_4) + \frac{\delta_4}{\tau_4}[v_1(t)/v_2(t) - w(t-\delta_4)] \quad (17)$$

in which $\delta_4$ is greater than or equal to $\delta_4$, $\tau_4$ is about equal to $\tau_3$ and $\tau_4 > \delta_3$.

The quasi-dc components of the digitized signals, $V_1$ and $V_2$, are derived from average values that are filtered using recursion formulas as follows:

$$X_1(t) = X_1(t-\delta_1) + \frac{\delta_1}{\tau_5}[V_1(t) - X_1(t-\delta_1)] \quad (18)$$

$$X_2(t) = X_2(t-\delta_1) + \frac{\delta_1}{\tau_5}[V_2(t) - X_2(t-\delta_1)] \quad (19)$$

wherein $\tau_5$ is about equal to $\tau_4$. The quasi-dc component of digitized signal $V_1$ is denoted as $S_1$ and the quasi-dc component of digitized signal $V_2$ is denoted as $S_2$.

Equations 9 through 19 are then recalculated using larger time constants, e.g., $\tau'_1 = 1.25\tau_1$, to compute the values u', v', w', and X'. The numerical coefficient, 1.25, is determined empirically.

The values of w and w' are then combined to determine R and the results for X and X' are combined to determine $S_1$ and $S_2$ as follows:

$$R = 2w(t) - w'(t), \quad (20)$$

$$S_1 = 2X_1(t) - X'_1(t), \quad (21)$$

and $$S_2 = 2X_2(t) - X'_2(t). \quad (22)$$

The combinations of primed and unprimed terms in Eqs. (20), (21) and (22) compensate for the inherent time delays of recursive filtering. The numerical coefficient, 2, of the unprimed terms is determined empirically.

In order to ensure that the above method accurately determines the temperature of the heated body, the pyrometer is calibrated. The relationship to wafer temperature is expressed as:

$$S_1 - RS_2 = \frac{f_1 \epsilon(R)}{1 + \exp(hc/\lambda k_B T)} \quad (23)$$

where calibration coefficient $f_1$ and $\epsilon(R)$ (an effective emittance) are determined by calibration, $\lambda$ is the detector wavelength, T is the wafer temperature, and h, c, and $k_B$ are fundamental constants of the Planck radiation law.

Equation (23) provides a definition of $\epsilon(R)$. The relationship between $\epsilon(R)$ and R is approximately linear for $\epsilon(R)$ greater than about 0.3 and is expressed as:

$$\epsilon(R) \cong 1 - \frac{f_2}{f_1} R, \quad (24)$$

where $f_2$ is a second calibration coefficient.

The calibration coefficients $f_1$ and $f_2$ and the functional relationship between $\epsilon(R)$ and R are obtained by using a thermocouple to measure the temperatures of test wafers in a lamp-heated rapid thermal annealing oven. A minimum of two wafers with different R measurements and that correspond to $\epsilon(R)$ greater than 0.3 are used to establish the coefficients $f_1$ and $f_2$ necessary to perform this calibration. Once the sensitivity of the sensors as a function of $\epsilon(R)$ is known, the sensors are used to monitor and control the heating of wafers.

The expression $S_1 - RS_2$ is close to zero when the heating lamps are first turned on because the radiation emitted by the water at low temperature is negligible compared to the reflected lamp radiation. However the two-sensor technique produces errors in computing R due to non-uniform output of the heating lamps and other defects. R is multiplied by an empirical factor F to compensate for these defects. F is determined by the following formula before the wafer is heated:

$$F = \frac{S_1}{RS_2}. \quad (25)$$

In calculating R as described above, it is advantageous if the wavelength of light detected by the photodetectors is about 1 μm to about 3 μm. It is advantageous if filters that transmit radiation with wavelengths of about 2 μm to about 31 μm are interposed between the probes and their respective detectors. For example, it is advantageous if the filters have a transmission band of about 2.4 μm and about 2.5 μm and the detector detects signals in that band. An example of a suitable detector is Indium Arsenide photodiode.

The signals in this wavelength region contain comparatively less interference from the heating lamps and the quartz components of the oven. Wavelengths shorter than about 1 μm contain noise from the reflected lamp radiation. Wavelengths longer than about 31 μm are affected by the absorption and emission of signals in this wavelength range by the quartz components in the oven. Consequently, it is advantageous if the wafer probe and the lamp probe are equipped with optical filters which transmit only signals in this wavelength range to their respective sensors. In one embodiment radiation passing through the iris-aperture for the wafer probe and the diffuser aperture for the lamp probe are transmitted by optical light guides to filters that only admit infrared radiation in this wavelength range.

After the signals are transmitted through the filters, conventional detectors such as, for example InAs photodiodes cooled to about $-30$ ° C., convert the radiation within the wavelength range to electrical currents. These electrical currents are then further converted to voltage signals by trans-impedance amplifiers. It is advantageous to use analog circuits to increase the amplitudes of the a.c. signals and to digitize the amplified a.c. component signals separately from the d.c. signals. These voltage signals are then transmitted to a computer which is programmed to perform the computations described above.

EXAMPLE 1

A group of 12.5 cm-diameter silicon wafers were coated with films made of several different materials to demonstrate a range of emissivities over a range of about 0.2 to about 0.9. The films were one or more of the following materials: polysilicon, silicon dioxide, and titanium silicide.. Thermocouples were bonded into shallow depressions in the water using zirconia-alumina refractory cement. The wafers were then placed in an oven and heated in the presence of two probes such as those previously described.

Figure 4:
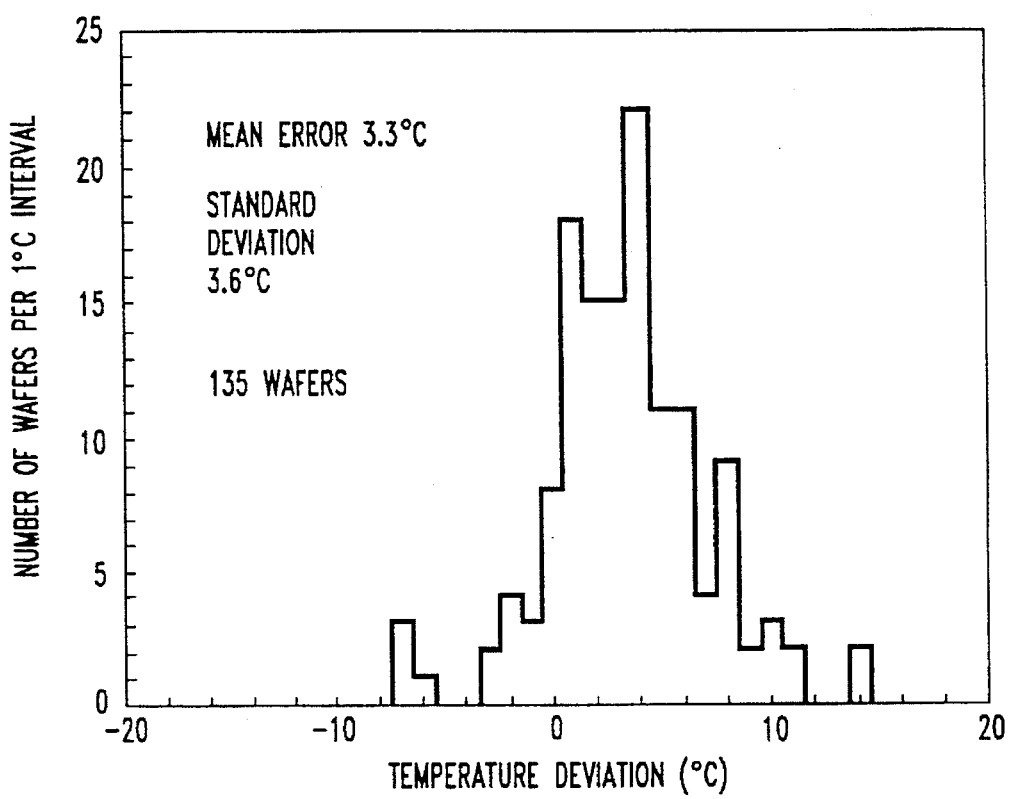
FIG. 4 is a calibration curve for an RTP system obtained by using wafers of varying backside emissivities.

The data from the thermocouples and the probes were recorded as the wafers were subjected to annealing conditions. The probes were equipped with infrared filters so that only radiation with wavelengths in the range of 2.4 µm to about 2.5 µm were detected by the photodetectors. The sensitivity coefficients $f_1$ and $f_2$ were obtained from a best fit of the temperatures computed from equation (23) and (24) to the thermocouple temperatures. The solid line illustrated in FIG. 4 is the linear relationship given by equation (24).

Once this calibration curve is obtained for a particular RTP system, the calibration curve is used to control the RTP process in that system. The linear region of the calibration curve is used for wafers having $\epsilon(R)$ greater than about 0.3. The calibrated pyrometer is then used to control the temperature of the body during processing as previously described using the equations above.

Figure 5:
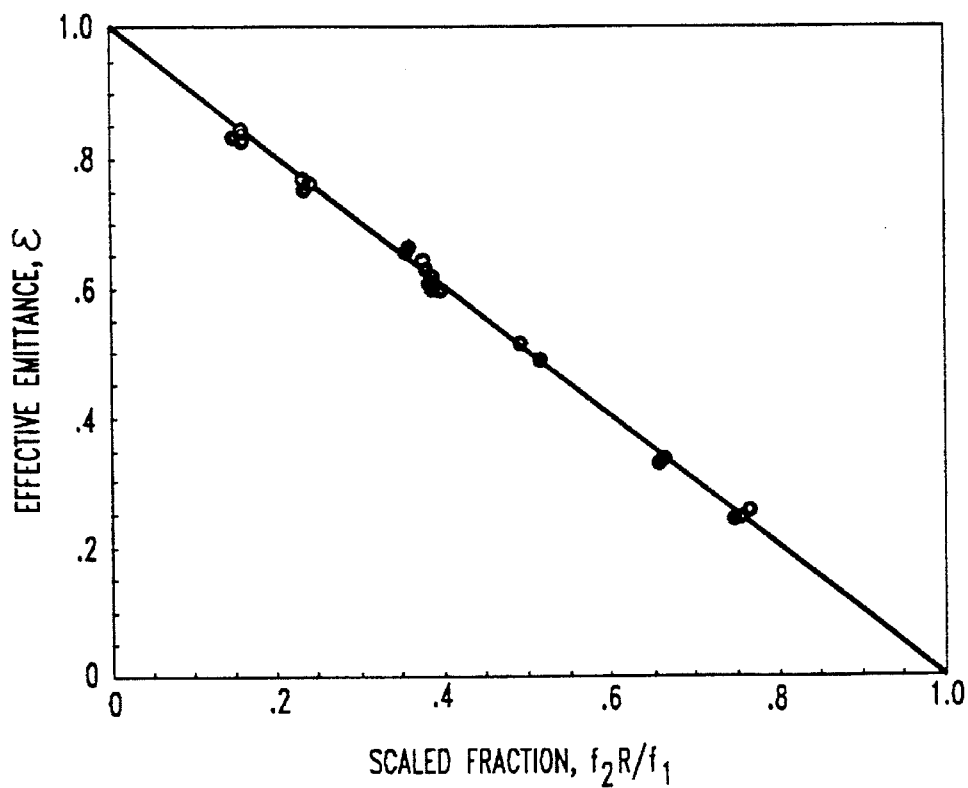
FIG. 5 is a histogram of the temperature errors determined in a series of trial runs in which temperature determinations according to the inventive method were compared with temperatures determined from the electrical resistivity of the heated waters.

Silicon wafers (135) were coated with 60 nm-thick films of titanium and annealed at temperatures of about 650° C. for one minute. Since the electrical resistivity of titanium silicide films varies with the processing temperature, the electrical resistivity of the films was measured after the process was completed to determine the temperature at which the wafer was processed. The amount that the temperatures determined using the method of the present invention deviated from the temperatures determined from the silicide resistivities are found in the histogram in FIG. 5. The mean error was 3.3° C. and the standard deviation was 3.6° C. As illustrated by FIG. 5, the deviation in temperature between the two techniques was small.

The invention claimed is:

1. A process for heating a body, comprising the steps of exposing the body to a controllable flux of electromagnetic radiation from at least one lamp energized by time-varying electric current, measuring the surface temperature of the body, and in response to the temperature measurement, controlling the flux of radiation, wherein the measuring step comprises:

a) collecting radiation emitted and reflected by the body in a first probe and detecting said radiation, leading to a first probe signal denoted $V_1$;

b) collecting radiation emitted and reflected by the body and at least one lamp in a second probe, and detecting said radiation, leading to a second probe signal denoted $V_2$;

c) determining the ac components of $V_1$ and $V_2$;

d) determining the dc components of $V_1$ and $V_2$;

e) determining R from the ac components of $V_1$ and $V_2$;

f) determining $\epsilon(R)$ from R such that the surface temperature of the body is calculated;

g) wherein in step (a), the first probe effectively samples radiation from an area of the body that subtends a solid angle $\Omega_1$ at the first probe; and h) wherein in step (b), the second probe effectively samples radiation from an area that subtends a solid angle $\Omega_2$ that includes the area of the body that subtends a solid angle $\Omega_2$ and at least one lamp.

2. The process of claim 1, wherein the radiation of step (b) includes radiation directly incident on the second probe from the lamp.

3. The process of claim 1, wherein the body has at least a first principal surface, in the exposing step lamp radiation is directly impinged at least on the first principal surface, a diffusively reflective surface is situated adjacent the first principal surface, the lamp is situated substantially within a plane intermediate the diffusively reflective surface and the first principal surface.

4. The process of claim 1, wherein the probes are calibrated prior to being used in the process.

5. The process of claim 4 wherein the probes are calibrated by determining the sensitivity of the probes as a linear function of $\epsilon(R)$.

6. The process of claim 5 wherein the probes are calibrated by measuring the temperatures of test wafers in an oven containing at least one lamp to establish at least one calibration coefficient, $f_1$, which is then used to compute $\epsilon(R)$ as a function of $S_1$, $S_2$, and R.

7. The process of claim 1 wherein the radiation emitted by the probe is in multiple phases, and the signals $V_1$ and $V_2$ are deconvolved before these signals are used to calculate the fraction R.

8. The process of claim 7 wherein R is determined by computing the linear functional dependence of the deconvolved signal $V_1$ and $V_2$.

9. An apparatus for heating a body comprising:

an enclosure;

a quartz envelope disposed within the enclosure;

a mounting surface adapted to receive a body to be heated disposed within the quartz envelope;

a plurality of lamps disposed between the interior of the enclosure and the quartz envelope;

a first radiation probe with a field of view defined by solid angle $\Omega_1$ placed in a first passageway in a wall of the enclosure wherein the first probe does not extend substantially into the interior of the enclosure and wherein the probe is positioned such that a portion of the body subtends $\Omega_1$ but no portion of the lamps subtend $\Omega_1$; and a second radiation probe with a field of view defined by the solid angle $\Omega_2$ placed in a second passageway in a wall of the enclosure wherein the second probe does not extend substantially into the interior of the enclosure and wherein the probe is positioned such that $\Omega_2$ is subtended by the portion of the body that subtends $\Omega_1$ and at least two lamps;

a means for elevating the temperature inside the enclosure; and a detector means for detecting signals from the first and second probes.

10. The apparatus of claim 9 wherein both probes are equipped with optical filters that prevent signals with a wavelength outside the range of about 1 µm to about 3 µm from being transmitted to the detector.

11. The apparatus of claim 9 wherein the field of view of the first probe is restricted by an optical baffle.

12. The apparatus of claim 11 wherein the optical baffle is an iris aperture.

* * * * *